US009592833B2

(12) United States Patent
Denigan et al.

(10) Patent No.: US 9,592,833 B2
(45) Date of Patent: Mar. 14, 2017

(54) METHOD AND APPARATUS FOR CAPTURING ROAD CURVE PROPERTIES AND CALCULATING MAXIMUM SAFE ADVISORY SPEED

(71) Applicant: Rieker Incorporated, Aston, PA (US)

(72) Inventors: Edward P. Denigan, West Chester, PA (US); Joseph P. Caruso, Downingtown, PA (US); Charles E. Gosnell, Ardmore, PA (US); Abhay A. Tambe, Philadelphia, PA (US)

(73) Assignee: RIEKER INC., Aston, PA (US)

( * ) Notice: Subject to any disclaimer, the term of this patent is extended or adjusted under 35 U.S.C. 154(b) by 0 days.

(21) Appl. No.: 13/833,624

(22) Filed: Mar. 15, 2013

(65) Prior Publication Data

US 2014/0172295 A1    Jun. 19, 2014

Related U.S. Application Data

(60) Provisional application No. 61/738,801, filed on Dec. 18, 2012.

(51) Int. Cl.
*G06F 17/00* (2006.01)
*B60W 30/18* (2012.01)
*B60W 40/072* (2012.01)
*B60W 50/00* (2006.01)

(52) U.S. Cl.
CPC .... *B60W 30/18145* (2013.01); *B60W 40/072* (2013.01); *B60W 2050/0089* (2013.01); *B60W 2520/125* (2013.01); *B60W 2550/402* (2013.01)

(58) Field of Classification Search
None
See application file for complete search history.

(56) References Cited

U.S. PATENT DOCUMENTS

| 2,831,266 | A | 4/1958 | Dorn et al. |
| 4,445,118 | A | 4/1984 | Taylor et al. |
| 4,942,668 | A | 7/1990 | Franklin |
| 6,523,409 | B2 * | 2/2003 | Brudis .................. G08G 1/167 73/488 |
| 2004/0236474 | A1 * | 11/2004 | Chowdhary et al. ............. 701/1 |

(Continued)

OTHER PUBLICATIONS

Bonneson,FHWA/TX-10/5-5439-01-1—Workshops on Using the GPS Method to Determine Curve Advisory Speeds Published on Dec. 2009.*

(Continued)

*Primary Examiner* — Truc M Do
*Assistant Examiner* — Jess Whittington
(74) *Attorney, Agent, or Firm* — Blank Rome LLP

(57) ABSTRACT

This invention relates generally to the field of Highway signage and more specifically to a device for automatically capturing road curve properties and a process for automating calculating the maximum safe Advisory Speed of Roads. This invention is a new device that automates the accurate measurement of road curve/Railway radius and super elevation. This information is assembled to automatically report the recommended curve speed, or Curve Advisor Speed (CAS) for a particular curve. The device is assembled into a single, compact, low power and transportable case which can be driven at normal road speeds in a car.

13 Claims, 8 Drawing Sheets

(56) References Cited

U.S. PATENT DOCUMENTS

2004/0236476 A1* 11/2004 Chowdhary ....... G06Q 30/0601
 701/1
2007/0213896 A1* 9/2007 Fischer .................. G01C 21/26
 701/33.4

OTHER PUBLICATIONS

Bonneson,FHWA/TX-07/0-5439-1—Development of Guidelines for Establishing Effective Curve Advisory Speeds, Published on Oct. 2007.*

Polynomial, Online education Webpage:http://www.mathsisfun.com/algebra/polynomials-behave.html, Visted on Nov. 4, 2013 and availsble as far back as Mar. 1, 2010.*

Pratt,FHWA/TX-1 0/5/5439-01-1—Workshops on Using the GPS Method to Determine Curve Advisory Speeds Published on Dec. 2009.*

Bonneson,FHWA/TX-07/0/5439-1—Development of Guidelines for Establishing Effective Curve Advisory Speeds, Published on Oct. 2007.*

TxDOT, Online Manual:http://onlinemanuals.txdot.gov/txdotmanuals/szn/determining_the_85th_percentile_speed.htm, Visited on Nov. 4, 2013, and availbe as far back as Jul. 4, 2008.*

Polynomial, Online education Webpage:http://www.mathsisfun.com/algebra/polynomials-behave.html, Visted on Nov. 4, 2013 and availsble as far back as Mar. 1 S\ 2010.*

NPL—Speed Concepts: Information Guide by the US Department of Transportation FHA, Pub. No. FHA-SA-10-001, accessed on Aug. 12, 2015, from http://safety.fhwa.dot.gov/speedmgt/ref_mats/fhwasa10001/.*

NPL-FHWA/TX-10/5-5439-01-1 Workshop on using the GPS Method to Determine Curve Advisory Speeds—Michael Prat, Published in Aug. 2009.*

NPL-FHWA-SA-10-001—Speed Concepts Information Guide—FHW—Published Sep. 2009.*

"Procedures for Setting Advisory Speeds on Curves," FHWA Safety Program, US Dept. of Transportation, Federal Highway Administration, Jun. 2011, pp. 1-35.

* cited by examiner

METHOD AND APPARATUS FOR CAPTURING ROAD CURVE PROPERTIES AND CALCULATING MAXIMUM SAFE ADVISORY SPEED

RELATED APPLICATION

This application claims the benefit of U.S. Provisional Application No. 61/738,801, filed Dec. 18, 2012, the entire contents of which are incorporated herein by reference.

BACKGROUND OF THE INVENTION

Field of the Invention

The present invention relates to a device for capturing road curve properties and calculating the maximum safe advisory speed.

Description of the Related Art

Technological advances in determining Road Curve speed has evolved over many years. Initial methods included using a level and a ruler to measure the super-elevation (i.e., bank angle) of a road curve and using survey techniques to estimate the radius of the turn. Later advances included the introduction of the Ball Bank Inclinometer/Accelerometer, such as shown by U.S. Pat. No. 2,831,266 to Dorn. The Ball Bank Inclinometer/Accelerometer is a device that displays the bank angle by reading the position of a ball suspended in a fluid filled curved clear glass tube. By holding the Ball Bank Inclinometer/Accelerometer level in a vehicle and driving the vehicle around a curve, the lateral acceleration could be observed. Then by selecting a preset limit, the driver, through trial and error, could determine the maximum speed that would stay within the preset limit.

Later advances replaced the Ball Bank Inclinometer/Accelerometer with a digital Inclinometer/Accelerometer, such as shown by U.S. Pat. No. 4,942,668 to Franklin. The digital devices provided a digital readout and an audible alert when the preset limit was exceeded. While this improved the accuracy of the reading by eliminating the driver's interpretation of the position of the ball, the process still required trial and error test runs and was subject to errors due to variations in vehicle speed. Lastly, the current technology required the operator to record the road that is being measured and to complete a report of the results manually.

The following patents and publications are hereby incorporated by reference. U.S. Pat. No. 4,445,118 is a navigation GPS system that was initially patented by NASA. This patent covers the technology for processing satellite based signals for determining location on the surface of the Earth. U.S. Pat. No. 6,523,409 to Brudis shows a roadway curve advisory speed determination system. Brudis describes a device that records the maximum lateral acceleration experienced by a vehicle by adding electrical sensors to a Ball Bank inclinometer. And, the DOT Federal Highway administration published document FHWA-SA-11-22 in June 2011 on a GPS Method for determining Curve Speed, documents a method for calculating road curve radius.

However, those previous technologies have a number of limitations. Using the Tilt Indicator (or Ball Bank) alone requires the operator to drive at a constant speed, record the speed of test, and simultaneously read the Ball Bank indicator. The testing requires multiple runs using "trial and error" to determine the maximum speed for achieving the lateral acceleration limits. Using two operators is more costly, but can reduce some of the error. But there is a large inherent error in reading and recording. Also errors are introduced by inconsistent driving speeds. Lastly, there is a labor intensive analysis that needs to be performed, post testing.

The Digital Inclinometer/Accelerometer reduced much of the read errors created by the Ball Bank solution. However, inconsistent vehicle speed, manual calculations, and post-test analysis still introduce additional labor and errors. This method also requires multiple runs as it is based on trial and error.

The Advisory Speed Meter, as shown in U.S. Pat. No. 6,523,409, automatically captures and records the maximum lateral acceleration experienced by a vehicle, but errors are still introduced by inconsistent vehicle speeds and manually processing the data post-test. This method is based on trial and error of various test runs.

SUMMARY OF THE INVENTION

Accordingly, it is an object of the invention to provide a system and method that captures road curve properties. It is a further object of the invention to determine the maximum safe advisory speed for a curve. It is yet another object of the invention to provide a system that automatically captures road curve properties and determines the maximum safe advisory speed for a curve.

The invention relates generally to the field of Highway signage and more specifically to a device for automatically capturing road curve properties and a process for automating calculating the maximum safe Advisory Speed of Roads. This invention is a new device that automates the accurate measurement of road curve/Railway radius and super elevation. This information is assembled to automatically report the recommended curve speed, or Curve Advisor Speed (CAS) for a particular curve. The device is assembled into a single, compact, low power and transportable case which can be driven at normal road speeds in a car.

This invention is compact, self-contained, and is easy to use. It is accurate, does not require any human intervention, and is cost efficient. This invention includes a reversionary mode that allows it to work when the GPS signal is lost.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1A:
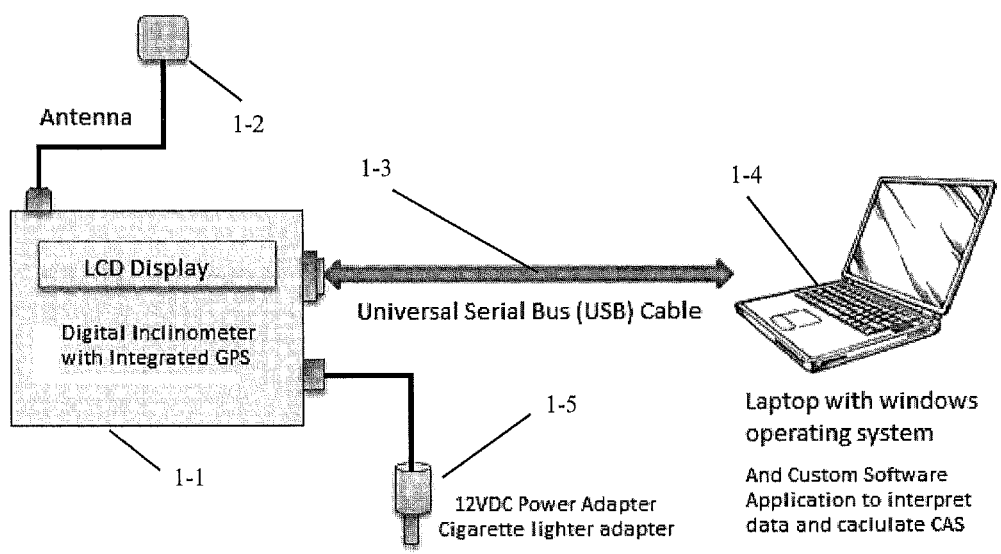
FIG. 1a is a diagram of the invention.

Referring to FIG. 1, the consolidated accelerometer and GPS receiver 1-1 is shown in accordance with the invention. The receiver 1-1 delivers new hardware, algorithms, and software (a custom computer application that automates the collection and reporting in a novel way). The receiver 1-1 comprises a single, compact box having two primary components: 1) Global Position Sensor (GPS) that presents its output data in a NMEA (National Marine Electronics Association) format. The GPS output contains the Latitude, Longitude, GMT Date/Time, and Velocity. The interface is USB and is refreshed at 5 Hz. And, 2) Digital Accelerometer (also referred to as an Inclinometer) which provides lateral acceleration, or side friction force. The interface is also over a USB interface. It should be appreciated, however, that any suitable components can be utilized within the spirit and scope of the invention.

The hardware is powered by the vehicle's electrical system, for example through the vehicle's standard cigarette lighter 1-5. The receiver 1-1 can also optionally include an antenna 1-2 and a computing device 1-4 (such as an external laptop) connected by a cable 1-3. However, the inclinometer and the GPS receiver 1-1 can instead be integrated with the computing device 1-4 or provided with a processor, memory, input device (e.g., keyboard, mouse, touchscreen) and like hardware to implement the invention. The antenna 1-2 improves coverage for the reception of the GPS signal. It communicates directly to the embedded GPS circuitry. The laptop 1-4 runs the custom software written as part of this invention to facilitate the capture of data and generate the result reports. The LCD display provides a visual indication of the immediate lateral acceleration or bank. It is used primarily in setting up the device and does not need to be read during testing.

The receiver 1-1 contains a digital display of the side friction force displayed in degrees. The data streams are consolidated for example over a single USB cable 1-3 which connects to a Windows Based computer 1-4, such as a laptop.

Thus, the receiver 1-1 can be implemented by a computer or computing device which is separate from or integral with the receiver 1-1. The receiver 1-1 can be separate from the computing device 1-4, or integral therewith. The computing devices of 1-1 and/or 1-4 has a processor to perform various functions and operations in accordance with the invention. The computer can be, for instance, a personal computer (PC) or Smartphone. In addition to the processor, the computer hardware may include one or more of a wide variety of components or subsystems including, for example, a co-processor, input devices, monitors, and a memory or storage device such as a database. The system can be a network configuration or a variety of data communication network environments using software, hardware or a combination of hardware and software to provide the processing functions. Unless indicated otherwise, the process is preferably implemented in automatically by the processor in real time without delay.

Algorithm

The receiver 1-1 and computing device 1-4 are preferably located inside a vehicle that is being driven by a single user. The software runs automatically as the user drives the vehicle. The software, as implemented by a processor at the receiver 1-1 or at the computing device 1-4, operates a multi-step algorithm for determining the Curve Advisory Speed. A byproduct of this process is the calculation of the subject road curve Radius and Super elevation.

Figure 1B:
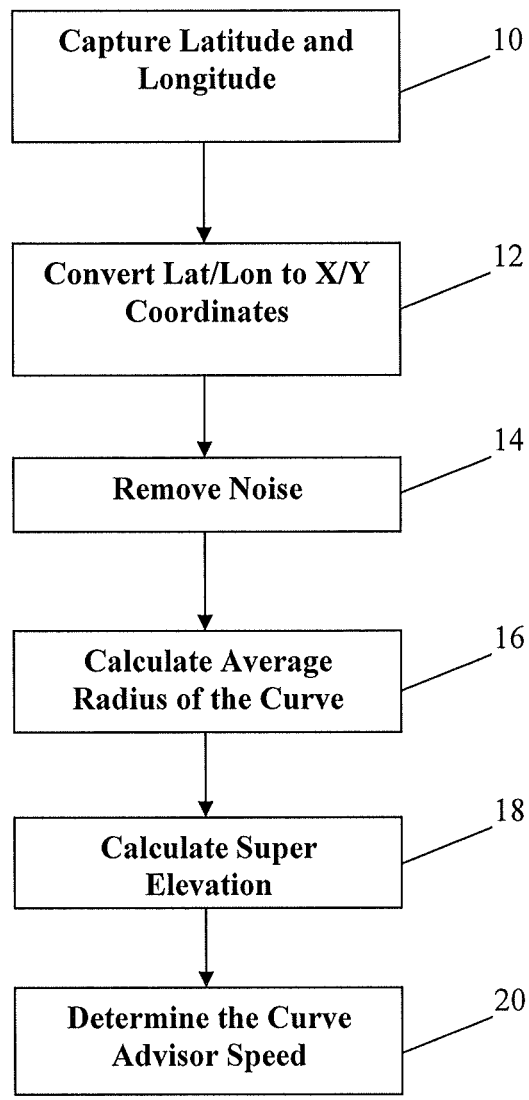
FIG. 1b is a flow diagram showing operation of the system.

Referring to FIG. 1b, operation of the system will now be described. Starting at step 10, the receiver 1-1 captures the Latitude and Longitude (Lat/Lon). The Lat/Lon of the receiver 1-1 position are recorded by an on-board GPS chip and sent via a USB interface and recorded in an XML format on a connected laptop. The Lat/Lon data is updated by the GPS chip and recorded every 300 mS.

At step 12, the processor 1-4 converts the Lat/Lon position to X/Y coordinates. The algorithm converts Lat/Lon position data into two dimensional Cartesian coordinate system based on the Universal Transverse Mercator (UTM) geographic coordinate. The UTM coordinates are stored as X, Y data pairs. It is convenient to use a Cartesian coordinate system for purposes of modeling the curve and its associated radius.

The conversion process starts by the GPS receiver 1-1 collecting position as Latitude and Longitude data pairs. The algorithms, however, model the position as a 2 dimensional curve expressed as a Cartesian, or X/Y, system. To convert from Latitude Longitude to X/Y the Universal Transverse Mercator coordinate system is utilized. The Universal Transverse Mercator (UTM) geographic coordinate system uses a two-dimensional Cartesian coordinate system to specify a location on the surface of the Earth. It is a horizontal position representation, i.e. it is used to identify locations on the Earth independently of vertical position. It can be determined from Latitude/Longitude.

Here, Lat=latitude of point; Lon=longitude of point; and $long_0$=central meridian of a zone. In addition, $k_0$=scale along $long_0$=0.9996. Even though it's a constant, it is retained as a separate symbol to keep the numerical coefficients simpler, also to allow for systems that might use a different Mercator projection. Also, $e=SQRT(1-b^2/a^2)$~0.08 approximately. This is the eccentricity of the earth's elliptical cross-section. And, $e'^2=(ea/b)^2=e^2/(1-e^2)$~0.007 approximately. The quantity e' only occurs in even powers so it need only be calculated as $e'^2$. Also, $n=(a-b)/(a+b)$, and $nu=a/(1-e^2 \sin^2(lat))^{1/2}$. This is the radius of curvature of the earth perpendicular to the meridian plane. It is also the distance from the point in question to the polar axis, measured perpendicular to the earth's surface. Finally, $p=(long-long_0)$ in radians.

To calculate the Meridional Arc distance, S is defined as the arc distance along the earth's surface from the equator to a particular point. Then: S=A'lat−B' sin(2lat)+C' sin(4lat)−D' sin(6lat)+E' sin(8lat) (all angles are in radians), where:

$A' = a[1-n+(5/4)(n^2-n^3)+(81/64)(n^4-n^5)\ldots]$ (approx.=6367449.1)

$B' = (3 \tan S/2)[1-n+(7/8)(n^2-n^3)+(55/64)(n^4-n^5)\ldots]$ (approx.=16038.43)

$C' = (15 \tan^2 S/16)[1-n+(3/4)(n^2-n^3)\ldots]$ (approx.=16.83261)

$D' = (35 \tan^3 S/48)[1-n+(11/16)(n^2-n^3)\ldots]$ (approx.=0.0219845)

$E' = (315 \tan^4 S/512)[1-n\ldots]$ (approx.=0.000313)

The terms "northing" and "easting" are utilized to indicate relative compass directions across the surface of the Earth. Thus we have UTM coordinates y and x, as follows: y=northing=K1+K2$p^2$+K3$p^4$, where K1=S$k_0$; K2=$k_0$ nu sin(lat)cos(lat)/2=$k_0$ nu sin(2 lat)/4; and K3=[$k_0$ nu sin(lat)$\cos^3$(lat)/24][(5−$\tan^2$(lat)+9$e'^2$ $\cos^2$(lat)+4$e'^4$ $\cos^4$(lat)]. And, x=easting=K4p+K5$p^3$, where K4=$k_0$ nu cos(lat); and K5=($k_0$ nu $\cos^3$(lat)/6)[1−$\tan^2$(lat)+$e'^2$ $\cos^2$(lat)]. Easting x is relative to the central meridian. For conventional UTM easting add 500,000 meters to x.

Referring back to FIG. 1b, the computing device 1-4 then removes noise from the data, step 14. The collected data is subjected to minor variations in accuracy. These inaccuracies are known as signal noise. This signal noise affects the accuracy of the data. The noise can be caused by inaccuracies in the GPS position, minor variations of the driver's position in the road lane, and minor inaccuracies in the electronics of the various components that comprise the device. Using any one data point to calculate the Recommended Curve Speed would work, but each point would yield a different result due the noise associated to that point. The noise is removed by averaging the data over a broader sample set, specifically, by using all the points along the length of the curve to create a consistent result that suppresses the noise. A novel approach to removing noise and random errors is to determine the equation of a curve that best fits the measured data points. Using this approach, it is determined that "second order" polynomial suits this purpose. A "second order" polynomial is expressed as: y=A$x^2$+Bx+C, where x and y are the coordinates of the position and coefficients of A, B, and C yield the "best fit" to the collected data set, and form modeled points.

This method for determining the "best fit" is referred to as the "Least Squares Regression for a Quadratic Curve". The coefficients, A, B, and C are found through Cramer's Method, for determining the Best Fit Quadratic Polynomial from a series of coordinates. The determination of the "best fit" curve is valuable in representing the collected position data as a single formula. Using the determined formula also has the advantage of removing noise because it naturally creates an average of the data points. It is called the "best fit" because this curve has the least deviation from the measured points to the modeled points on the curve than any other curve represented with a second order polynomial. Higher order polynomial curves could be used to more closely match the modeled curve to the measured data, but there is increased processing required and experimentation has found no substantial benefit to the final results.

A second order, or Quadratic, polynomial is represented as follow: y=a$x^2$+bx+c, where x and y are coordinates of position and a, b, and c are the coefficients that yield the "best fit" to the collected data set. The coefficients can be found using Least Square Regression algorithm.

Since we have three unknown coefficients, we need three sets of equations to solve the system. The three equations are derived from the above polynomial equation as follow:

$ax^2+bx+c=y$  1.

$ax^3+bx^2+cx=xy$ ... Multiplying both sides by 'x'.  2.

$ax^4+bx^3+cx^2=x^2y$ ... Multiplying both sides of equation by $x^2$.  3.

By applying Crammer's rule on above set of equations, we have the following matrix:

$$\begin{pmatrix} \Sigma x^2 & \Sigma x & n \\ \Sigma x^3 & \Sigma x^2 & \Sigma x \\ \Sigma x^4 & \Sigma x^3 & \Sigma x^2 \end{pmatrix} \begin{pmatrix} a \\ b \\ c \end{pmatrix} = \begin{pmatrix} \Sigma y \\ \Sigma xy \\ \Sigma x^2 y \end{pmatrix}$$

By rearranging, the inverse matrix is then:

$$\begin{pmatrix} a \\ b \\ c \end{pmatrix} = \begin{pmatrix} \Sigma y \\ \Sigma xy \\ \Sigma x^2 y \end{pmatrix} \begin{pmatrix} \Sigma x^2 & \Sigma x & n \\ \Sigma x^3 & \Sigma x^2 & \Sigma x \\ \Sigma x^4 & \Sigma x^3 & \Sigma x^2 \end{pmatrix}^{-1}$$

At step 16, the computing device 1-4 then calculates the average Radius of the Curve. Determining the radius accurately is an important element in the determination of the recommended curve speed. Curve radius expresses the "tightness" of the curve—the smaller the radius, the "tighter" the turn, and therefore requiring a lower the recommended speed. The Radius R is determined for the "best fit curve."

Figure 4:
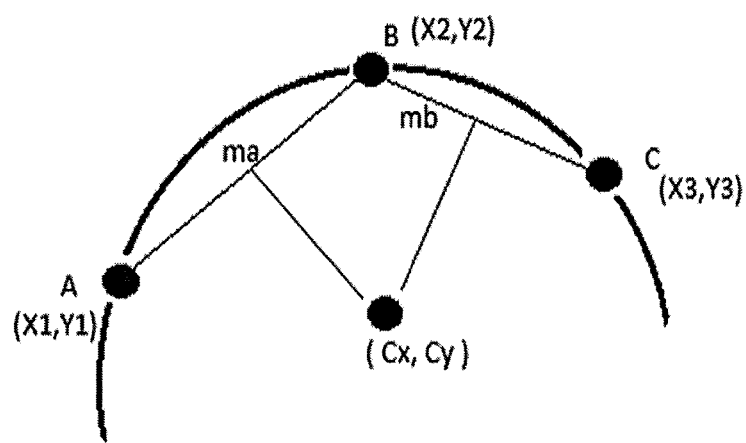
FIG. 4 shows the three point method for determining a curve radius.

By using the modeled curve, instead of the actual data points, large deviations caused by signal noise and minor variations in vehicle direction are minimized and a smooth and continuous radius can be determined. It is valuable to have a smooth and continuous radius so that the "minimum radius" can be easily and accurately identified. Using the points from the modeled curve, the Radius is calculated using the "Three point method" (FIG. 4), which defines the relationship of Velocity, Curve Radius and Centrifugal Acceleration.

The relationship between Velocity, Curve radius and lateral or centrifugal acceleration is determined using physics. The benefit of this formula is that we can determine any one of these by knowing the other two. So, if there is one unknown, the formulae can be rearranged to determine the unknown value. This formula is used to determine radius when velocity and road elevation are known from the measurements. Similarly, it can be used to determine road elevation when velocity and radius are known from the measurements. Therefore, using the same formula, the Curve advisory speeds can be calculated for a road. Or, the target elevation can be calculated for a railway.

According to Newton's second law: Force($F$)=Mass($m$)*Acceleration($a$)

$$F = m \cdot \frac{d\vec{v}}{dt} \qquad (1)$$

where: $\vec{v}$ =velocity vector. Movement of an object along a curve of radius R with a frame of reference fixed to the object, the object would rotate with constant angular velocity ($\omega$), such that:

$$\vec{\omega} = \frac{v}{R}\hat{k} \qquad (2)$$

$$\frac{d\vec{v}}{dt_I} = \frac{d\vec{v}}{dt_B} + \vec{\omega} \times \vec{V} \qquad (3)$$

Where subscripts I and B represents inertial and body fixed frame quantities Substituting eq. (3) in eq. (1)

$$\vec{F} = m \cdot \frac{d\vec{v}}{dt_B} + m\vec{\omega} \times \vec{V} \qquad (4)$$

Velocity of a Point Mass $$\vec{V} = v\hat{i}$$

By substation, the acceleration is calculated as:

$$\frac{d\vec{V}}{dt_B} = -a_x\hat{i} \qquad (5)$$

Substituting equation (5) and (2) in eq. (4)

$$F = -ma_x\hat{i} + \frac{mv^2}{R}\hat{j} \qquad (6)$$

Figure 3A:
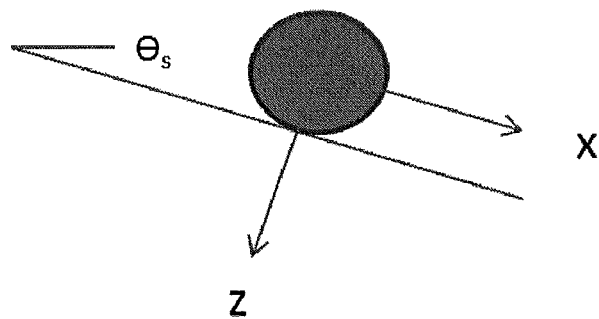
FIG. 3a-3d show the braking axis, cornering axis, and braking forces.
Figure 3B:
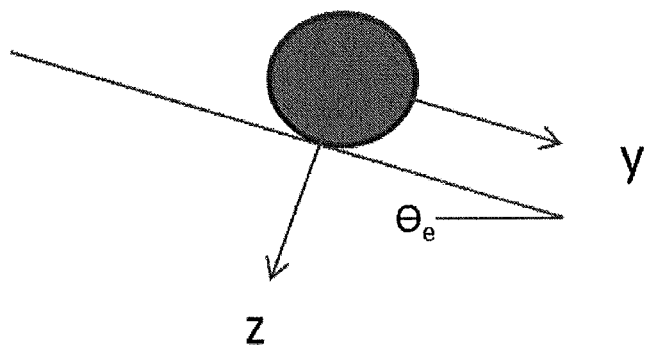

Considering these forces on an object in motion in three dimensions, we will use the X, Y, Z Cartesian coordinate system. FIGS. 3a and 3b depict the orientation of these axes relative to the vehicle along a sloped and banked road surface, where X is the axis along the direction of the road, Z is the axis normal to the plane of the road surface, and $\theta_s$ is the angle of the slope of the road surface as measured from the horizontal, defined as Super Elevation.

Braking and Cornering Forces Definitions:

We define the Braking force, $F_x$, as the force needed to drive the vehicle along the surface of the road. We further define this as the x axis. The slope of the road is defined by angle $\theta_s$. The Cornering force, $F_y$, is defined as the lateral force needed to keep the vehicle on a banked road where the road is banked at angle $\theta_e$. We define this direction as the y-axis and define $\theta_e$ as the Super Elevation of the road surface.

We further define these as:

$F_x$, force acting along the x-direction is given as:

$$F_x = -F_b + mg\sin\theta_s \qquad (7)$$

$F_x$: Force in x-direction
$F_b$: Braking force
N: Normal reaction $$F_y = F_c + mg\sin\theta_e \qquad (8)$$

Where $F_y$=Force in y-direction, and $F_b$=Cornering force.

Figure 3C:
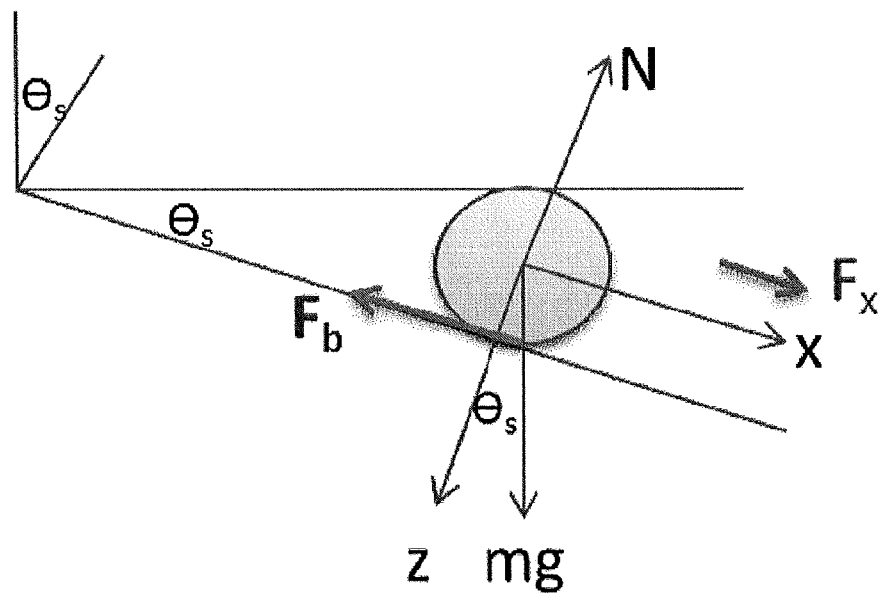
Figure 3D:
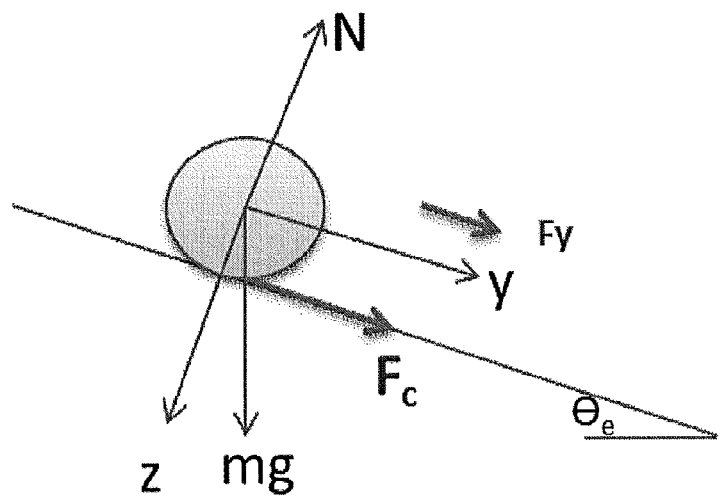

FIG. 3c depicts the Braking Forces. FIG. 3d depicts the Cornering Forces, where N is the Normal Force acting in the opposite direction of the surface of the road, $F_b$ is the braking force (i.e., the force needed to keep the vehicle from accelerating while on a slope of angle $\theta_s$), $\theta_s$ is the angle of the slope of the road surface as measured from the horizontal (this is the same angle between the Normal force and the constant force of Gravity), $F_c$ is the cornering force (the force needed to keep the vehicle from sliding while on a bank of angle $\theta_e$), and $\theta_e$ is the angle of the bank of the road surface as measured from the horizontal.

$$F_z = mg - N \qquad (9)$$

Where $F_z$ is the Force in Z-direction, which is normal to the surface, and mg is the Weight of the object due to gravity.

The total force, F, on the object would then be:

$$F = F_x + F_y + F_z \qquad (10)$$

Using equations (6), (7), (8), (9)

$$-ma_x\hat{i} + \frac{mv^2}{R}\hat{j} = (-F_b + mg\sin\theta_s)\hat{i} + (F_c + mg\sin\theta_e)\hat{j} + (mg - N)\hat{k}$$

Since angle $\theta_s$ and $\theta_e$ are small, $\sin\theta_s = \theta_s$ and $\cos\theta_e = \theta_e$
Or, by substitution:

$$\frac{mv^2}{R} = F_c + mg\theta_e$$

And rearranging:

$$F_c = \frac{mv^2}{R} - mg\theta_e \qquad (11)$$

Replacing $$\frac{F_c}{N} = f$$

$$f = \frac{v^2}{gR} - \theta_e$$

For small angles, $\theta_e = e$, therefore, by substitution:

$$R = \frac{V^2}{g(e+f)}$$

Where: g is the universal acceleration due to gravity.
To standardize on units, we use $$g = 32.18 \text{ ft/sec}^2$$

and use the conversion factor of 1.466 mph per ft/sec.
By Substitution:

$$R = \frac{V^2}{15(e+f)}$$

Where, R=radius (ft), V=velocity (mph), e=super elevation (ft/ft), and f=side friction (ft/ft).

Next, at step 18, the receiver 1-1 and/or computing device 1-4 calculates the Super Elevation. By combining Radius, Velocity and measured side friction acceleration, the Super Elevation of the curve can be found according to:

$$e = \frac{V^2}{15R} - f \qquad (12)$$

where e=Super Elevation (ft/ft), R=Radius (ft.) as calculated, V=Velocity (mph) from the GPS, and f=Side Friction (ft/ft) from the digital inclinometer. The derivation of this formula is the "Three Point Method" (FIG. 4) for determining Radius along a curve. The "three point method" is a way of determining the radius of a curve at a specific point, using a point on either side of this point. It is used because of its simplicity in calculation.

A replacement of this method would be to determine the tangent of the point using the polynomial curve, however, experimental evaluation has found little difference between these methods.

A constant radius of a circle can be described by three, non-linear points. If the coordinates of the points are known, or can be calculated, the radius of the circle can be found by determining the center of the circle. Let the center, C, be located at point ($C_x$, $C_y$). If the three points are described by A ($X_1$, $Y_1$), B ($X_2$, $Y_2$), and C ($X_3$, $Y_3$), then the Center can found by:

$$C_x = \left( \frac{m_a m_b (y1 - y3) + m_b (x1 + x2) - m_a (x2 + x3)}{2(m_b - m_a)} \right)$$

$$C_y = -\frac{c_x - \frac{x_1 + x_2}{2}}{m_a} + \frac{y_1 + y_2}{2}$$

Where: A ($X_1$, $Y_1$), B ($X_2$, $Y_2$), and C ($X_3$, $Y_3$) are coordinates of points A, B, and C along the curve, ma is the slope of line AB, and mb is the slope of line BC.

The radius, R, from the center ($C_x$, $C_y$) can then be found from:

$$R = \sqrt{(C_x - x_N)^2 + (C_y - y_N)^2}$$

Where $x_N$, $y_N$ can be any point along the curve.

This formula (12) is also used for determining the required elevation to give zero side friction for a specific speed, as would be the case of a railway. The practical use for a railway is that the Super Elevation, or bank angle, which eliminates side forces for a specific speed can be calculated. To calculate Super Elevation, e, for a specified speed, we can substitute the side friction, f=0, and replace the measured velocity, V, with the desired rail car velocity. This would yield:

$$e = \frac{V^2}{15R}$$

Where e is the super elevation calculated to produce no side force, V is the desired speed of the railcar, and R is the calculated Radius of the track segment.

This formula (12) is used in the case that the operator wants to calculate the required changes to a rail curve to facilitate a different rail car speed and achieve a zero lateral force (side force) on the rail car. As an example, if the rail needs to facilitate a faster moving train car, this allows the operator to determine any needed change to the bank, or elevation, of the rail. The practical use for this variation of the formula, is that one could survey a known segment of a railway and determine the work needed or track elevation changes needed to a specific curve to support a railcar traversing safely at a higher speed.

At step 20 (FIG. 1*b*) the Curve Advisor Speed is determined. Substituting $f_{max}$ for f and solving for $V_{CAS}$, the Curve Advisor Speed is then calculated from $$V_{CAS} = \sqrt{15R(e + f_{max})}$$

where: e=calculated Super Elevation (ft/ft)
R=calculated Radius (ft.) as calculated
V=measured Velocity (mph) from the GPS
$f_{max}$=Max Side Friction (ft/ft) recommended by the municipality The Maximum Side Friction is typically decreased by the municipalities for higher speeds. An example of the default values can be found in Table 1 below for maximum recommended acceleration. Table 1 shows the criteria that specify a the maximum recommended lateral acceleration, $f_{max}$, for different speeds, as published by the American Association of State Highway and Transport.

TABLE 1

| Speed (mph) | Ball Bank Reading | Lateral Acceleration |
|---|---|---|
| <20 (mph) | 16° | 0.28 (ft/ft) |
| 25-30 (mph) | 14° | 0.24 (ft/ft) |
| >35 (mph) | 12° | 0.21 (ft/ft) |

The calculations are independent of vehicle weight, though can be affected to a small degree by the vehicles suspension.

Software UI

The custom design software integrates the data streams from the GPS and Digital inclinometer unit and applies the mathematical algorithms described above to present the operator with the recommended advisor speed, as shown in Table 2 below, for any road segment driven.

TABLE 2

| Term | Symbol | Units | Definition |
|---|---|---|---|
| Radius | R | Feet | used to describe the curvature of the road |
| Minimum Radius | $R_{min}$ | Feet | used to describe a point along the curve where the Radius is the smallest, or the turn is the tightest |
| Velocity | V | Miles/Hour (mph) | used to describe the speed of the vehicle traveling along the curve |
| Average Velocity | $V_{avg}$ | Miles/Hour (mph) | describes the Average velocity calculated around the curve |
| Max Velocity | $V_{max}$ | Miles/Hour (mph) | describes the Maximum velocity measured around the curve |
| Super Elevation | e | feet/feet | describes the bank of the curve, as measured from the horizontal |
| Side Friction | f | feet/feet | describes the lateral acceleration experienced due to the centrifugal force of traveling around a particular curve at velocity V |
| Max Recommended Side Friction | $f_{max}$ | feet/feet | Describes the maximum acceleration recommended by a particular municipality. |

TABLE 2-continued

| Term | Symbol | Units | Definition |
|---|---|---|---|
| Force of Gravity | g | Feet/sec$^2$ | Universal Constant force due to gravity. Equal to 32.2 ft/sec$^2$ |
| Curve Advisory Speed | $V_{CAS}$ | Miles/Hr | Recommended speed to be signed on the curve |

Figure 2A:
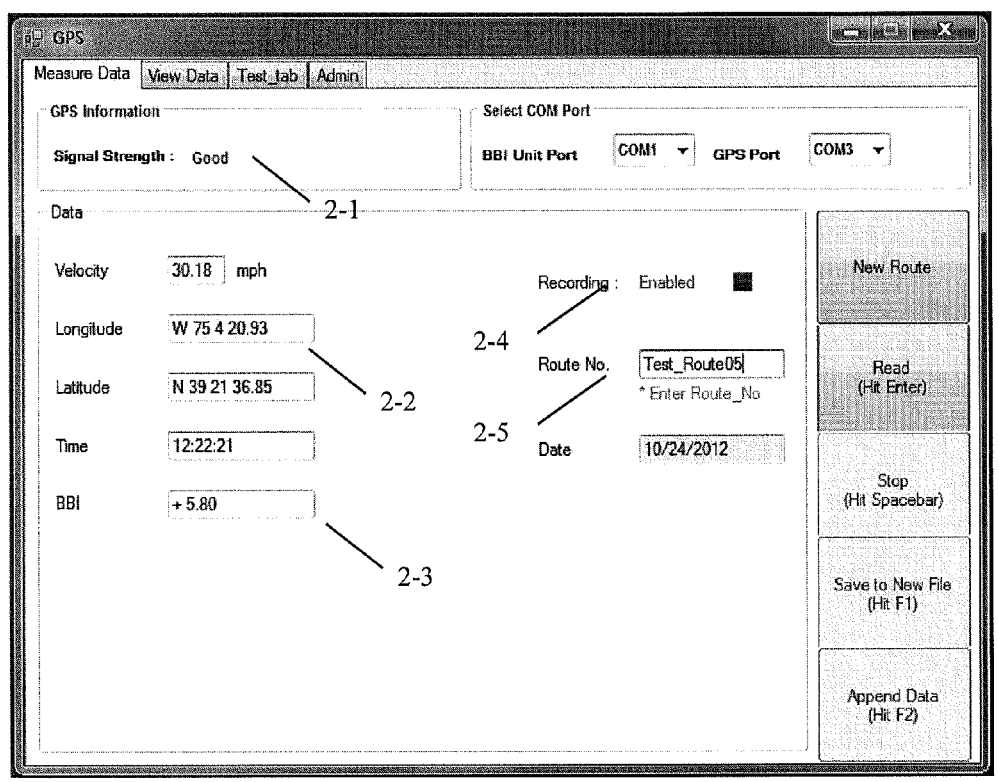
FIGS. 2a-2c are screen shots of the application software.

The UI is designed for simple and intuitive use. It is intended to be used on a standard Windows PC computer, with no special requirements. The operator uses the Software to:

1) Capture road data of subject roads. The software can continuously record data without operator intervention. FIG. 2a provides an example of this function. Here, the GPS signal strength indicator 2-1 shows the strength of the GPS signal. The output 2-2 from the GPS is recorded, such as velocity, longitude, latitude, and date/time. The lateral acceleration 2-3 is captured and recoded by the inclinometer. The display also shows the status of the recording mode 2-4, as well as the route number 2-5 entered by the user.

Figure 2B:
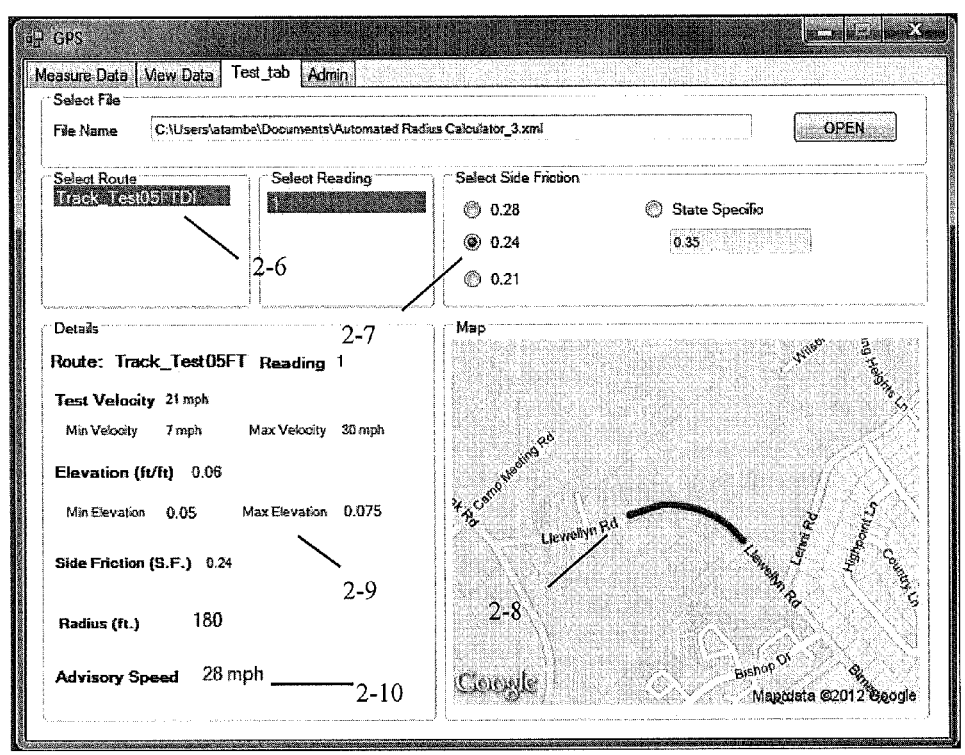

2) Displays the results of and details of a particular curve including the automated Curve Advisor Speed. FIG. 2b provides an example of this function. Here, the user selects the route, and the selection of recorded data files created during the data collection phase is shown at 2-6. The selected or user specified side friction limit 2-7 is shown. It is typically determined by the local municipality or state department of transportation. The graphical display 2-8 of the collected data is automatically shown in a road map. The display also shows details 2-9 of the collected road segment displaying velocity, friction, and radius. The calculated Curve Advisory Speed 2-10 is automatically calculated using collected data.

Figure 2C:
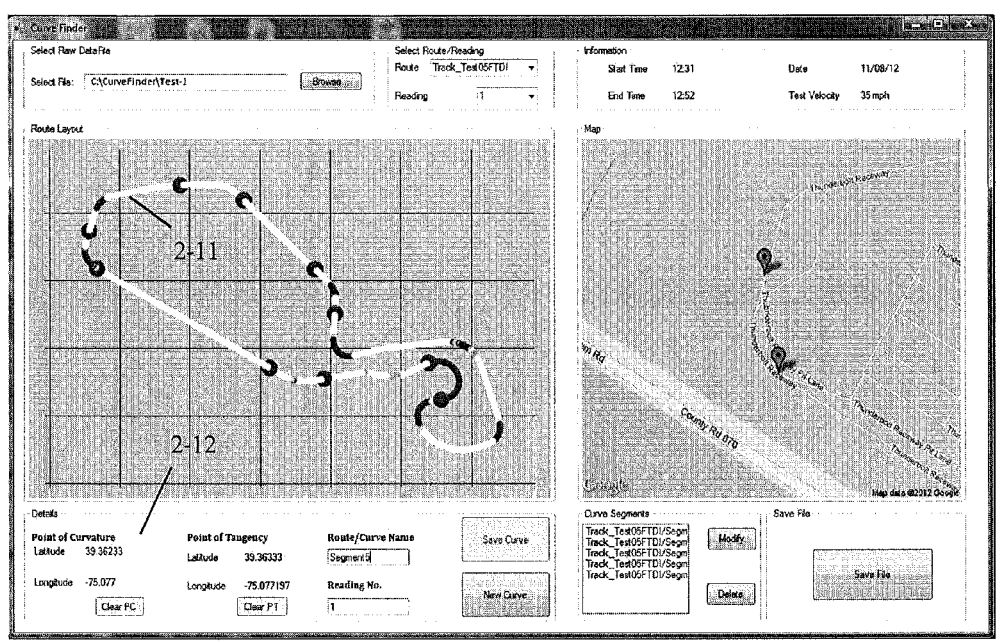

3) Allows the user to identify specific curves for multi curve data collection. When an operator collects data over many roads or roads with complex curves, the software provides a screen to automatically identify areas of potential interest and allows the operator to specify the desired curves for analysis. FIG. 2c provides an example of this function. Representation 2-11 of road data collected during data collection is shown and automatically mapped. Curves are automatically highlighted for the operator. Operator selects the curves graphically. Details are also shown of a particular curve 2-12 showing the Point of Curvature (PC) and the Point of Tangent (PT).

4) Generate a report, specific to a municipality containing the test results, the specified road or route, and the recommended Curve Advisor Speed for posting the signage. The software also provides for a reversionary mode in the event that the GPS signal is lost. In this case, the operator can supply the test velocity and road segment definition to so that testing can be conducted. In this mode, CAS is still determined, however, Radius and Super-elevation are not.

By combining accurate GPS positioning and vehicle speed with an accurate bank angle and collecting that data on a computer, the device works with a single pass at any speed, including if the user stops the vehicle. This eliminates the need for trial and error testing; eliminates the need to maintain a constant speed; eliminates stopping and starting measurements at every curve, and driving at slow test speeds; eliminates manual reporting and calculations; eliminates manually determining the segment being tested. Advantages to a consumer include automatic calculation of the Curve Advisory Speed for any State requirement; automatic calculation of curve Radius and Super Elevation; automatic detection of road curve, with PC/PT end points; works at any speed with one pass; and works with GPS signal loss and two passes.

Accordingly, the invention (including the hardware, algorithm and software described above) can be implemented by a computer or computing device having a processor to perform the various functions and operations in accordance with the invention. The computer can be, for instance, a personal computer (PC), server or mainframe computer. In addition to the processor, the computer hardware may include one or more of a wide variety of components or subsystems including, for example, a co-processor, input devices, monitors, and a memory or storage device such as a database. The system can be a network configuration or a variety of data communication network environments using software, hardware or a combination of hardware and software to provide the processing functions. Unless indicated otherwise, the process is preferably implemented in automatically by the processor in real time without delay.

The novel organization of algorithms provides several distinct advantages. Specifically, manual labor and intervention is dramatically reduced over contemporary methods. Manual effort is reduced because this solution allows for a single pass instead of "trial and error". The single pass is accomplished because of the combination of GPS accuracy and the algorithms to reduce signal noise. Also, because the inclinometer is integrated with the system, these calculations are valid for any speed and any road angle, so the operator doesn't have to maintain a constant velocity. Also, there is less chance of human error because the calculations are performed automatically.

The practical use of this device is for an engineer or surveyor to collect enough data for a particular roadway or railway to determine specific safety characteristics associated to the curves of the measured roadway or railway.

The device is capable of making the advisory speed determination with a single pass, including if the vehicle comes to a stop on the curve. If we look at the governing equation:

$$R = \frac{V^2}{15(e+f)},$$

We can rearrange such that:

$$e = \frac{V^2}{15R} - f.$$

Substituting, V=0, the equation will simplify to: e=−f where is f is measured directly from the inclinometer.

All or parts of the system and processes can be implemented at the processor 1-4 by software or other machine executable instructions which is stored on or read from non-transitory computer-readable media for performing the processes described above. Computer readable media may include, for instance, one or more: hard disks, floppy disks, and CD-ROM; or other forms of computer-readable memory such as read-only memory (ROM) or random-access memory (RAM), solid-state, analog or other memories; optical and/or magnetic media; a centralized or distributed database; and/or caches.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

The invention claimed is:

1. A device for use in a vehicle traveling at varying velocities on a road having a curve, said device comprising:
    a digital inclinometer or accelerometer configured to provide measured side friction data experienced by the vehicle when traveling at the varying on the curve including when the vehicle is stopped on the curve;
    a GPS receiver configured to provide a plurality of measured data points, each data point having a time, longitude data for the vehicle, latitude data for the vehicle, and speed data when the vehicle is traveling at the varying velocities on the curve including when the vehicle is stopped on the curve; and
    a processor configured to determine a recommended speed for the curve based on the measured side friction data, time, longitude data and latitude data, wherein said processor is further configured to determine a radius of the curve based on the longitude data and the latitude data, and to determine the recommended speed based on the radius, the speed data, and the measured side friction data,
    wherein said processor determines the radius of the curve by generating a parabola based on the longitude data and the latitude data for each of the plurality of collected data points and determining the radius for each of the plurality of collected data points.

2. The device of claim 1, said processor further configured to determine a bank of the curve based on said side friction, and to determine a radius and location of the curve based on the longitude data and the latitude data.

3. The device of claim 2, wherein said processor correlates the determined hank of said curve with the determined radius and location of said curve.

4. The device of claim 1, wherein said inclinometer or accelerometer, and GPS receiver are integrated into a single integral unit.

5. The device of claim 1, wherein said inclinometer or accelerometer, GPS receiver, and processor are integrated into a single integral unit.

6. The device of claim 1, wherein the recommended speed is Department of Transportation guidelines.

7. The device of claim 1, said processor further determining a smooth and continuous radius and super elevation of road surface based on the modeled curve.

8. The device of claim 1, wherein the modeled curve removes noise.

9. The device of claim 1, wherein the processor is configured to use the longitude data and the latitude data to determine locations along the curve, to fit a modeled curve to the locations, and to determine a radius of the curve from the modeled curve.

10. A device for use in a vehicle traveling at varying velocities on a roadway or at varying velocities on a railway having a curve, said device comprising:
    a digital inclinometer or accelerometer configured to provide side friction data for the vehicle when traveling at the varying velocities on the curve including when the vehicle is stopped on the curve;
    a GPS receiver configured to provide longitude data and latitude data for the vehicle when traveling at the varying velocities on the curve including when the vehicle is stopped on the curve; and
    a processor configured to determine a recommended super elevation for the curve based on the side friction data, longitude data and latitude data, wherein said processor is further configured to determine a radius of the curve based on the longitude data and the latitude data,
    wherein said processor determines the radius of the curve by generating a parabola based on the longitude data and the latitude data for each of the plurality of collected data points and determining the radius for each of the plurality of collected data points.

11. The device of claim 7, wherein the device is governed by the following equation:

$$e = \frac{V^2}{15R} - f$$

where e=super elevation (ft/ft), V=speed (mph) from the GPS receiver, R=radius (ft), and f=side friction (ft/ft) from the digital inclinometer or accelerometer.

12. A method for a vehicle traveling at varying velocities on a road having a curve, said method comprising:
    providing, using a digital inclinometer or accelerometer, measured side friction data experienced by the vehicle when traveling at the varying velocities on the curve including when the vehicle is stopped on the curve;
    providing, using a GPS receiver, time, longitude data for the vehicle, latitude data for the vehicle, and speed data when traveling at the varying velocities on the curve including when the vehicle is stopped on the curve;
    determining, using a processor, a recommended speed for the curve based on the measured side friction data, time, longitude data and latitude data;
    determining, using the processor, a radius of the curve based on the longitude data and the latitude data; and
    determining, using the processor, a recommended speed based on the radius, the speed data, and the measured side friction data,
    wherein said processor determines the radius of the curve by generating a parabola based on the longitude data and the latitude data for each of the plurality of collected data points and determining the radius for each of the plurality of collected data points.

13. The device of claim 10, wherein the device is governed by the following equation:

$$e = \frac{V^2}{15R} - f$$

where e=super elevation (ft/ft), V=speed (mph) from the GPS receiver, R=radius (ft), and f=side friction (ft/ft) from the digital inclinometer or accelerometer.

* * * * *